United States Patent [19]
Miller

[11] 3,879,062
[45] Apr. 22, 1975

[54] TRAILER HITCH GUIDE

[76] Inventor: Daniel C. Miller, Rt. 2, Box 355, Bethel Island, Calif. 94561

[22] Filed: Aug. 12, 1974

[21] Appl. No.: 496,486

[52] U.S. Cl. .............................................. 280/477
[51] Int. Cl. .............................................. B60d 1/06
[58] Field of Search .................... 280/477, 511, 501

[56] References Cited
UNITED STATES PATENTS

| | | | |
|---|---|---|---|
| 3,675,947 | 7/1972 | Blagg | 280/477 X |
| 3,682,360 | 8/1972 | Fletcher | 280/511 X |
| 3,747,958 | 7/1973 | Hackett | 280/477 |
| 3,765,703 | 10/1973 | Voelkerding | 280/477 |
| 3,773,356 | 11/1973 | Eichels | 280/477 |

Primary Examiner—David Schonberg
Assistant Examiner—R. Schrecengost
Attorney, Agent, or Firm—Townsend and Townsend

[57] ABSTRACT

Apparatus for guiding the leading end of a trailer tongue into engagement with a mating hitch ball of an automobile or other towing vehicle is disclosed. The apparatus includes a rearwardly opening V-shaped element superimposed over and around the hitch ball on the towing vehicle. The V-shaped element is adapted to intersect the leading end of the trailer tongue when the towing vehicle is moved toward the trailer to guide the leading end of the tongue into position over the hitch ball. Apparatus are further provided for demountably fixing the V-shaped element to the towing vehicle so that it can easily be removed after the trailer is hitched. The V-shaped element is fixed to the towing vehicle so that forces on the V-shaped element are transmitted directly to the vehicle and will not damage nor create impact stresses in the hitch ball support during hitching of the trailer.

9 Claims, 6 Drawing Figures

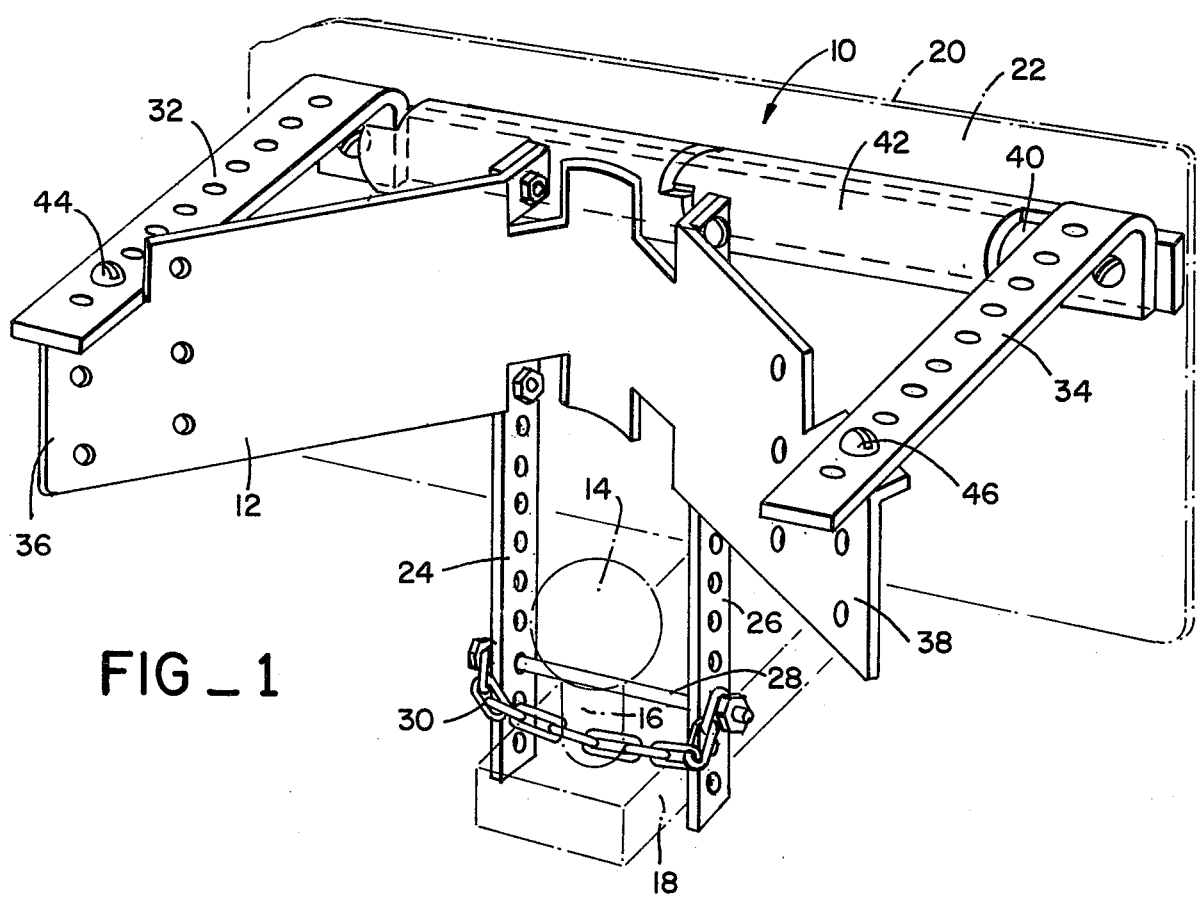
FIG_1
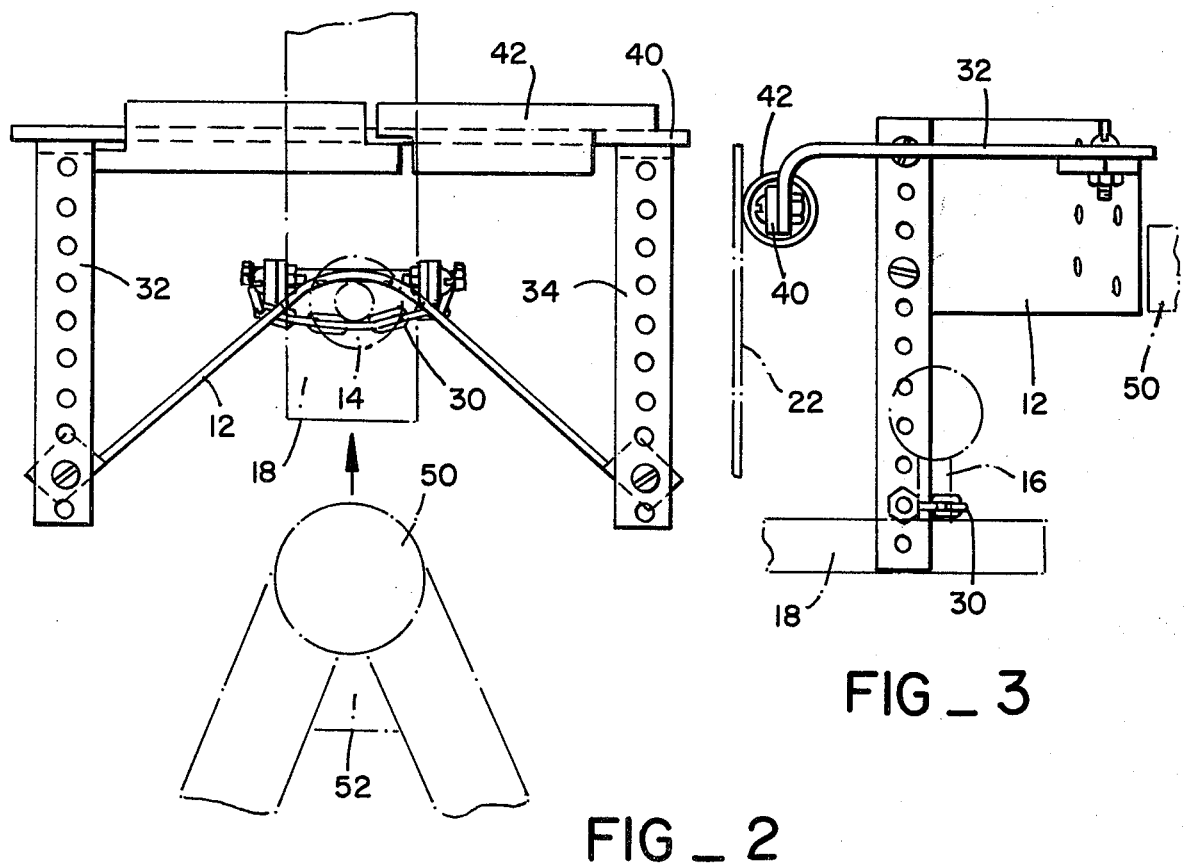
FIG_2
FIG_3

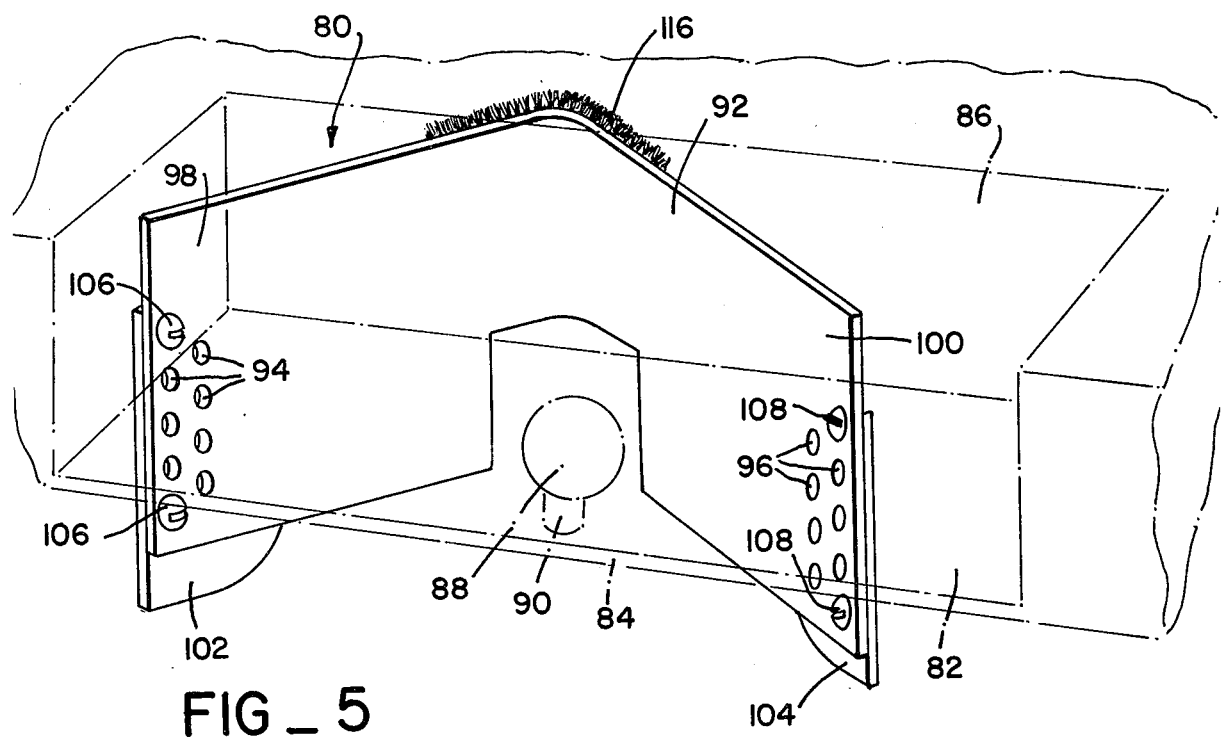
FIG_5
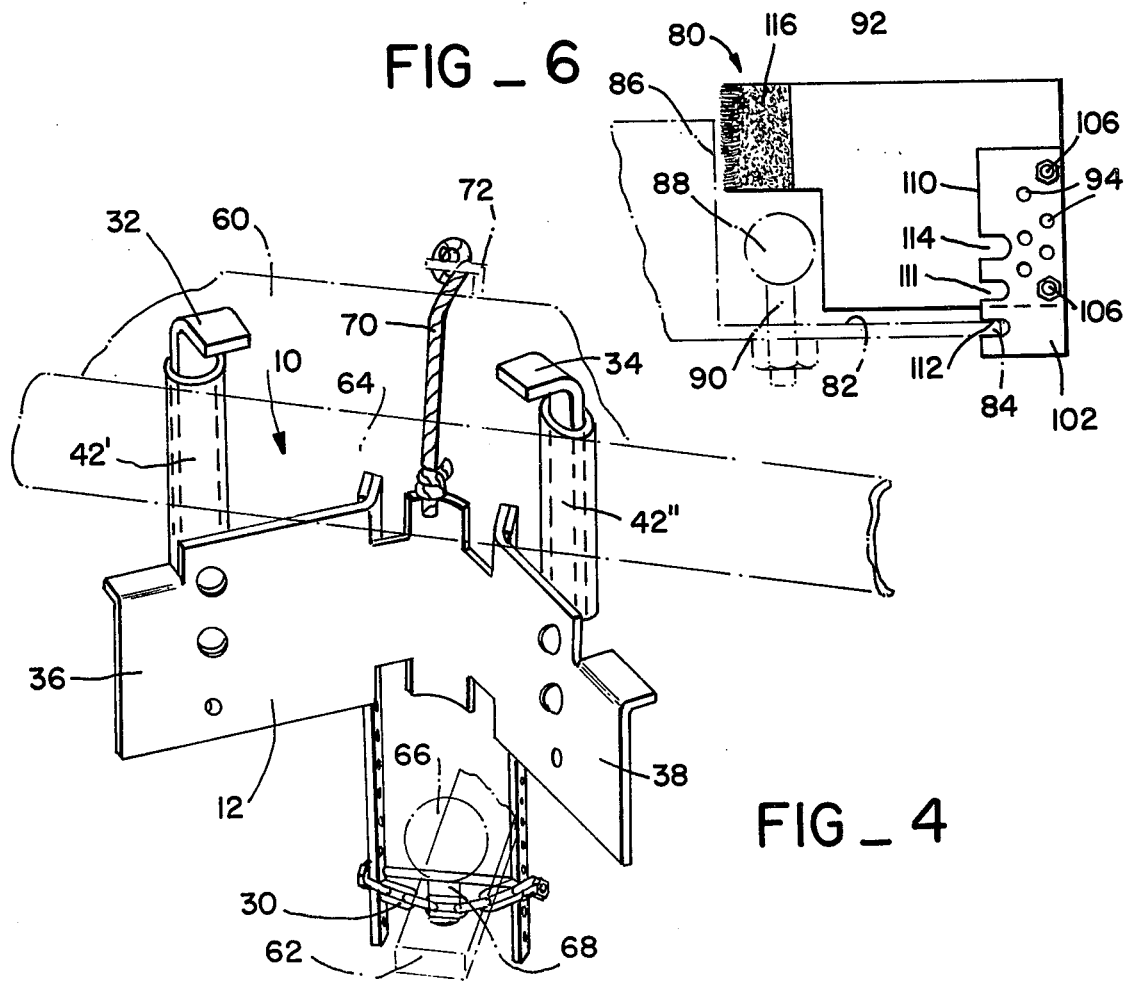
FIG_6
FIG_4

TRAILER HITCH GUIDE

BACKGROUND OF THE INVENTION

The present invention relates to trailer hitch alignment devices, and in particular to a trailer hitch alignment device which is operable with existing trailer hitches and is demountably attachable to the towing vehicle.

Automobiles or other vehicles which are adapted to tow a trailer are ordinarily provided with a hitch bar extending rearwardly from the rear bumper, and a hitch ball mounted on the bar. Trailers are correspondingly provided with a tongue having a female element at the leading end thereof adapted to mate with the hitch ball. In order to engage the hitch ball with the leading end of the trailer tongue, the tongue is ordinarily jacked to a position higher than the hitch ball, and the automobile is backed toward the trailer so that the hitch ball is located directly beneath the leading end of the trailer tongue, unless the trailer is so small that it can easily be moved by hand. The difficulty with this procedure is that the person operating the towing vehicle cannot actually see the hitch ball and trailer tongue and must guess at their positions when he attempts to move the towing vehicle into position. Ordinarily, the operator of the vehicle must make several trys at correctly positioning the vehicle, and risk the danger of the trailer tongue accidentally denting the vehicle. Even with several attempts, the positioning of the towing vehicle with respect to the trailer tongue is often far less than optimum, and a person finally mating the trailer tongue with the hitch ball may be injured if the trailer tongue slips out of position when the trailer tongue is being unjacked.

A wide variety of apparatus are shown in prior art patents which attempt to solve the above-enumerated problems. However, the difficulty with most of these types of devices is that they require a change to the standard hitch ball arrangement traditionally used on trailers and towing vehicles, and thus such apparatus cannot be used with available trailers and other equipment.

Recent attempts to provide apparatus for solving the above problems while still employing the standard hitch ball are typified by the patent to Eichels et al., U.S. Pat. No. 3,773,356. Eichels provides a V-shaped element on a support which is adapted to be attached and form part of the traditional hitch ball and hitch bar construction now used. This construction solves many of the problems set forth above, but it introduces many of its own problems. The Eichels apparatus is designed to restrict the extent to which the trailer can turn relative to the towing vehicle since the extremities of the V-shaped element will intersect the trailer tongue during sharp turns. Also, when the V-shaped portion of the Eichels apparatus is used as a guide for the trailer tongue, all stresses exerted on the V-shaped element by the trailer tongue are transmitted directly to the hitch bar which is not designed nor manufactured to support such an attachment.

Because of the possible damage to the various parts of the trailer hitch bar and ball by impact, especially latent stresses which may cause failure in transit on the highways, the use of the Eichels apparatus may void the warrantys offered by the manufacturers of such assemblies.

The present invention provides a trailer hitch alignment device also having a rearwardly opening V-shaped element superimposed over and around the hitch ball on the towing vehicle. The V-shaped element is adapted to intersect the leading end of the trailer tongue and guide it into position over the hitch ball. The present invention provides apparatus for demountably fixing the V-shaped element to the towing vehicle so that the element is attached relatively below the position of the hitch ball. A support is provided which is attached to the V-shaped element and adapted to rest against a relatively rigid, generally vertical portion of the towing vehicle relatively above the position of the hitch ball. The support limits movement of the V-shaped element when intersected by the leading end of the trailer tongue and transmits the force directly to the towing vehicle.

The present invention provides two embodiments of a hitch alignment device which vary depending on the configuration of the towing vehicle. For automobiles and other such vehicles having the hitch ball mounted on a hitch bar projecting from beneath the rear bumper of the vehicle, a chain is provided which partially circumscribes the support strut for the hitch ball to demountably attach the V-shaped element to the hitch bar below the position of the hitch ball. A transverse bar or vertically projecting arms are adapted to rest against the license plate or bumper of the towing vehicle so that forces of the V-shaped element are transmitted directly to the towing vehicle and are not exerted on the hitch bar. In the other embodiment adapted for towing vehicles having a flat bumper with a rearwardly directed lip, slots are provided at the extremities of the V-shaped element which engage the lip on the bumper, and a pad is provided on the outer surface of the base of the V-shaped element. With each embodiment, forces on the V-shaped element are transmitted directly to the towing vehicle and not to the hitching apparatus. The device is padded so that the towing vehicle will not be damaged by the force exerted by the trailer on the hitch guide.

In each of the embodiments described above, the hitch alignment device is a simple attachment to the towing vehicle and can be used with standard hitching arrangements. The device is readily demountable from the vehicle and is intended for use only during actual hitching of the trailer. Thus, the device does not obscure the license plate of the towing vehicle except when the trailer is being hitched. Also, the device will not interfere with turning of the trailer relative to the towing vehicle and exert undue stress on the vehicle or the hitch guide. Even during hitching of the trailer, most of the stress exerted on the V-shaped element by the trailer tongue is transmitted directly to the towing vehicle and not to the hitching apparatus so that the hitching apparatus is not damaged. Yet, the hitch alignment device of the present invention provides a safe means for guiding the trailer tongue into position over the hitch ball without damaging either the trailer tongue or the towing vehicle.

The novel features which are characteristic of the invention, both as to organization and method of operation, together with further objects and advantages thereof, will be better understood from the following description considered in connection with the accompanied drawings which preferred embodiments of the invention are illustrated by way of example. It is to be

3

BRIEF DESCRIPTION OF THE DRAWINGS

FIG. 1 is a perspective view of an embodiment of the present invention adapted primarily for use on an automobile;

FIG. 2 is a plan view of the embodiment of the present invention illustrated in FIG. 1;

FIG. 3 is a side elevation view of the embodiment of the present invention illustrated in FIGS. 1 and 2;

FIG. 4 is a perspective view illustrating a potential second application of the embodiment of the present invention illustrated in FIGS. 1-3;

FIG. 5 is a perspective view of a second embodiment of the present invention adapted for use on trucks or other vehicles having flat bumpers;

FIG. 6 is a side elevation view of the embodiment of the present invention illustrated in FIG. 5.

DESCRIPTION OF THE PREFERRED EMBODIMENTS

An embodiment 10 of the present invention intended primarily for use with standard passenger automobiles is illustrated in FIG. 1. Embodiment 10 includes a rearwardly directed substantially V-shaped element 12 which is superimposed over and surrounds a hitch ball 14. Hitch ball 14 is mounted on a support strut 16 to a hitch bar 18 which is attached to the rear of an automobile or like vehicle 20. Hitch bar 18 projects rearwardly beneath the license plate 22 of vehicle 20 which is ordinarily mounted in a flat spot in or immediately above the bumper of the vehicle. A pair of multi-apertured members 24, 26 project downwardly from the outer base surface of V-shaped element 12 to a position surrounding hitch bar 18. A bolt 28 projects through corresponding apertures in members 24, 26 and is adapted to rest on top of hitch bar 18 forward of support strut 16. The weight of hitch guide 10 thus rests primarily on hitch bar 18. The position of bolts 28 along apertured members 24, 26 can be varied to suit the dimensions of different automobiles 20 so that V-shaped element 12 is positioned properly with respect to hitch ball 14. In order to demountably attach V-shaped element 12 to hitch bar 18, a chain 30 or other flexible tension member is provided which goes around and partially circumscribes support strut 16 so that a combination of the chain and bolt 28 demountably attach the V-shaped element to hitch bar 18 below the position of hitch ball 14.

A pair of multi-apertured arms 32, 34 are attached to the outer extremities 36, 38 of V-shaped element 12. A transverse arm 40 is connected to the free ends of apertured arms 32, 34 and is provided with split padding 42 which rests against license plate 22 on towing vehicle 20. Apertured arms 32, 34 are connected to V-shaped element 12 by bolts 44, 46 projecting through respective apertures on the arms, and the bolts can be adjusted along the apertured arms to adjust to the configuration of varying towing vehicles. The balance of hitch alignment apparatus 10 is preferably such that it will rest against towing vehicle 20 of its own accord. If not, a rope can be provided to hold the hitch guide in position as will be illustrated hereinafter.

4

The operation of V-shaped element 12 in directing the leading end 50 of trailer tongue 52 into position over hitch ball 14 is illustrated in more detail by way of reference to FIGS. 2 and 3. When the towing vehicle is backed toward the trailer, leading end 50 of tongue 52 is raised relative to hitch ball 14 by means of a jack (not shown). Thus, the leading end 50 of the trailer tongue will intersect V-shaped element 12 which is super-imposed above and around hitch ball 14. As the towing vehicle is backed further toward the trailer tongue, V-shaped element 12 will center the leading end of the trailer tongue over the hitch ball. V-shaped element 12 is held in place by bolt 28 and chain 30 surrounding strut 16 and also by transverse arm 40 which prevents yawing motion of the assembly.

When leading end 50 of the trailer tongue intersects V-shaped element 12, the major portion of the force exerted by the tongue on the V-shaped element will be transmitted through arms 32, 34 to transverse bar 40. Only a relatively small portion of the force will be transmitted to support strut 16 of hitch ball 14 by chain 30. Padding 42 surrounding transverse bar 40 is in abutment with the license plate 22 or other generally vertical rigid portion of the towing vehicle so that the force from the trailer tongue is transmitted directly to the vehicle and not through hitch bar 18 so that the hitch bar is not damaged. Padding 42 spreads this force over a relatively large area of the towing vehicle so that it will not be dented or damaged in any way.

A secondary application of the embodiment 10 of the present invention illustrated in FIGS. 1-3 is illustrated by way of reference to FIG. 4. This application of embodiment 10 applies to towing vehicle 60 wherein the hitch bar 62 is a significant distance below the bumper 64 of the vehicle. In this application, V-shaped element 12 is superimposed above and around hitch ball 66 as in the previous embodiment, and chain 30 circumscribes the support strut 68 so that the V-shaped element is again demountably attached to the hitch bar. A rope 70 is attached to the upper edge of V-shaped element 12 and is attached to a bracket 72 or other convenient location on the towing vehicle so that V-shaped element 12 does not move out of position. Arms 32, 34 are detached from their vertical position illustrated previously and are re-attached to the outer extremeties 36, 38 of V-shaped element 12 so that they are maintained in a vertical position. The padding formerly illustrated surrounding the transverse arm is removed therefrom and split into two halves 42', 42" and placed over arms 32, 34. Padding 42', 42" now rests against the bumper of towing vehicle 60 so that force from the trailer tongue intersecting the V-shaped element is transmitted directly there-through to the bumper of the towing vehicle and is again not transmitted to the hitch bar. Arms 32, 34 now prevent yawing motion of V-shaped element 12. Hence, the operation of embodiment 10 illustrated in FIG. 4 is similar in principle to the application thereof illustrated in FIGS. 1-3 and also achieves the objects of the present invention.

A second embodiment 80 of the present invention adapted for use with towing vehicles having a flat bumper section 82 is illustrated by way of reference to FIGS. 5 and 6. Flat bumper section 82 has a rearwardly directed lip 84 and a vertical portion 86 normal to the direction of travel of the vehicle. A hitch ball 88 is mounted to the flat portion 82 of the bumper by support strut 90 and is positioned adjacent rearwardly directed lip 84.

Embodiment 80 of the present invention also has a V-shaped element 92 which includes a plurality of apertures 94, 96 in outer extremities 98, 100 of V-shaped element 92 by bolts 106, 108 projecting through selected apertures 94, 96. The position of plates 102, 104 can be adjusted by using different apertures 94, 96 to adjust embodiment 80 of the present invention to different configurations of various towing vehicles. Plates 102, 104 are curved as indicated so that the leading edge such as 110 of plate 102 is directly forwardly with respect to the towing vehicle. A plurality of slots 112, 113 and 114 are provided in leading edge of plate 104. One of the slots 112 and a corresponding slot in plate 104 are adapted to engage rearwardly directed lip 84 of the bumper. Slots 112, 113 and 114 have varying widths and plates 102, 104 are adjustable to adapt the apparatus 80 to verying bumper thicknesses.

The outer surface of the base of V-shaped element 92 is provided with a pad 116 which is in abutment with the vertical portion 86 of the bumper. When a trailer tongue intersects V-shaped element 92 as the trailer tongue is being positioned over hitch ball 88, a portion of the force of the trailer tongue is directed to vertical portion 86 of the bumper of the towing vehicle, and the rest is directed to rearwardly directed lip 84, so that the force is not transmitted to hitch ball 88 or its support strut 90. Plates 102, 104 prevent yawing motion of V-shaped element 92 as the trailer is being positioned, but the entire apparatus 80 can easily be removed after the trailer is hitched.

In each of the embodiments of the present invention, the hitch alignment device (10 or 80) is demountably attached to the towing vehicle so that it can easily be removed after use. In addition, the force exerted by the leading end of the trailer tongue is primarily transmitted directly to rigid structural portions of the vehicle rather than to the hitch mechanism. The position of the hitch alignment device is fixed during the hitching operating even when the trailer tongue hits one or the other sides thereof so that yawing motion of the hitch guide is prevented.

While preferred embodiments of the present invention have been illustrated in detail, it is apparent that modifications and adaptations of those embodiments will occur to those skilled in the art. However, it is to be expressly understood that such modifications and adaptations are within the spirit and scope of the present invention, as set forth in the following claims.

What I claim as new is:

1. Apparatus for guiding the leading end of trailer tongue into engagement with a mating hitch ball of an automobile or other towing vehicle, said apparatus comprising:
    a rearwardly opening V-shaped element superimposed over and around the hitch ball on the towing vehicle and adapted to intersect the leading end of the trailer tongue when the towing vehicle is moved toward the trailer to guide the leading end of the tongue into position over the hitch ball;
    means for demountably fixing the V-shaped element to the towing vehicle, said means being relatively below the position of the hitch ball; and
    support means attached to the V-shaped element and adapted to rest against a relatively rigid generally vertical portion of the towing vehicle relatively above the position of the hitch ball to limit movement of the V-shaped element when intersected by the leading end of the trailer tongue and transmit the force of such intersection directly to the towing vehicle.

2. Apparatus as recited in claim 1 wherein the hitch ball on the towing vehicle has a depending support strut, and wherein the means for fixing the V-shaped element to the towing vehicle includes a chain adapted to at least partially circumscribed the support strut so that the V-shaped element can easily be demounted from the towing vehicle.

3. Apparatus as recited in claim 2 wherein the support means comprises a transversely mounted bar adapted to rest against the license plate of the towing vehicle and prevent yawing movement of the V-shaped element.

4. Apparatus as recited in claim 2 wherein the support means comprises a pair of transversely spaced generally vertical bars adapted to rest against the bumper of the towing vehicle and prevent yawing movement of the V-shaped element.

5. Apparatus as recited in claim 1 wherein the bumper of the towing vehicle has a generally flat portion including a rearwardly directed lip, and wherein the means for demountably fixing the V-shaped element to the towing vehicle comprises a pair of slots at the outer extremities of the V-shaped element adapted to engage the rearwardly projecting lip of the bumper to prevent yawing movement of the V-shaped element, and wherein the support means comprises a pad on the outer surface of the base of the V-shaped element.

6. Apparatus for guiding the leading end of a trailer tongue into engagement with a mating hitch ball of an automobile or other towing vehicle, said apparatus comprising:
    a rearwardly opening V-shaped element superimposed over and around the hitch ball on the towing vehicle and adapted to intersect the leading end of the trailer tongue when the towing vehicle is moved toward the trailer to guide the leading end of the tongue into position over the hitch ball;
    a vertical support member projecting downwardly from the base of the V-shaped element, the lower end of said support member adapted to overlie the hitch bar;
    a flexible tension member at the lower end of the support member adapted to partially circumscribe the support strut of the hitch ball to demountably fix the V-shaped element in position relatively below the hitch ball;
    a pair of arms attachable to respective outer extremities of the V-shaped elements in either of two positions, one said position having the arms extend relatively forwardly with respect to the towing vehicle and the other position having the arms extending vertically with respect to the towing vehicle; and
    a transverse bar attachable to the free ends of the arms when said arms are in the first position, whereby the transverse bar is abutable against the license plate of the vehicle when the arms are in the first position and the arms are abutable against the bumper of the towing vehicle when said arms are in the second position to adapt the apparatus to different towing configurations.

7. Apparatus for guiding the leading end of a trailer tongue into engagement with a mating hitch ball of an automobile or other towing vehicle having a bumper including a generally flat portion having a rearwardly directed lip, said apparatus comprising:

a rearwardly opening V-shaped element superimposed over and around the hitch ball on the towing vehicle and adapted to intersect the leading end of the trailer tongue when the towing vehicle is moved toward the trailer to guide the leading end of the tongue into position over the hitch ball, the outer extremities of said V-shaped element having respective slots forwardly directed with respect to the towing vehicle and adapted to engage the rearwardly projecting lip of the bumper; and a pad on the outer surface of the base of the V-shaped element adapted to abut the generally vertical portion of the bumper to fix the V-shaped element in position when intersected by the leading end of the trailer tongue.

8. Apparatus for guiding the leading end of a trailer tongue into engagement with a mating hitch ball of an automobile or other towing vehicle, said apparatus comprising:

a rearwardly opening V-shaped element superimposed over and around the hitch ball on the towing vehicle and adapted to intersect the leading end of the trailer tongue when the towing vehicle is moved towards the trailer to guide the leading end of the tongue into position over the hitch ball;

a vertical support member projecting downwardly from the base of the V-shaped element, the lower end of said support member adapted to overlie the hitch bar so that the principal weight of the V-shaped element is borne by the hitch bar;

support means at the base of the V-shaped element and adapted to rest against a relatively rigid generally vertical portion of the towing vehicle relatively above the position of the hitch ball, the V-shaped element biased against the vertical portion of the towing vehicle to maintain the V-shaped element in position.

9. Apparatus as recited in claim 8 and additionally comprising a rope attachable to the towing vehicle and adapted to bias the weight of the V-shaped element against said towing vehicle.

* * * * *